(12) United States Patent
Nishikawa et al.

(10) Patent No.: US 9,338,786 B2
(45) Date of Patent: May 10, 2016

(54) REFERENCE SIGNAL TRANSMITTING METHOD, MOBILE TERMINAL APPARATUS AND RADIO BASE STATION APPARATUS

(75) Inventors: Daisuke Nishikawa, Tokyo (JP); Kazuaki Takeda, Tokyo (JP); Yoshihisa Kishiyama, Tokyo (JP); Nobuhiko Miki, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 267 days.

(21) Appl. No.: 13/703,633

(22) PCT Filed: Jun. 16, 2011

(86) PCT No.: PCT/JP2011/063808
§ 371 (c)(1),
(2), (4) Date: Jan. 7, 2013

(87) PCT Pub. No.: WO2011/162158
PCT Pub. Date: Dec. 29, 2011

(65) Prior Publication Data
US 2013/0201849 A1    Aug. 8, 2013

(30) Foreign Application Priority Data

Jun. 21, 2010   (JP) .................................. 2010-141069

(51) Int. Cl.
*H04W 72/08*  (2009.01)
*H04L 5/00*   (2006.01)

(52) U.S. Cl.
CPC ........... *H04W 72/085* (2013.01); *H04L 5/0048* (2013.01); *H04L 5/001* (2013.01); *H04L 5/0091* (2013.01)

(58) Field of Classification Search
USPC ................................................. 370/329, 330
See application file for complete search history.

(56) References Cited

U.S. PATENT DOCUMENTS

| 2011/0128922 | A1* | 6/2011 | Chen et al. ..................... 370/329 |
| 2011/0170499 | A1* | 7/2011 | Nayeb Nazar et al. ........ 370/329 |
| 2011/0310818 | A1* | 12/2011 | Lin et al. ...................... 370/329 |
| 2012/0182957 | A1* | 7/2012 | Noh et al. ..................... 370/329 |
| 2013/0153298 | A1* | 6/2013 | Pietraski et al. ............... 175/45 |
| 2014/0362811 | A1* | 12/2014 | Lin et al. ...................... 370/329 |

FOREIGN PATENT DOCUMENTS

WO    WO 2011034399 A2 *  3/2011  .................... 370/329

OTHER PUBLICATIONS

"SRS Transmission Issues in LTE-A", document # R1-091879, May 4, 2009, Samsung, pp. 1-2.*
Motorola, May 14, 2015, 3GPP TSG RAN WG1 Meeting No. 61, document No. R1-103187, "LTE-A Dynamic Aperiodic SRS—Triggering, Duration, Timing, and Carrier Aggregation"; pp. 1-4.*
International Search Report issued in PCT/JP2011/063808 mailed Sep. 6, 2011 (2 pages).
3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

* cited by examiner

*Primary Examiner* — Brandon Renner
*Assistant Examiner* — Manuel Rangel
(74) *Attorney, Agent, or Firm* — Osha Liang LLP

(57) ABSTRACT

It is an object of the present invention to provide a reference signal transmitting method, a mobile terminal apparatus and a base station apparatus capable of reducing influences on a PDCCH even when performing transmission control over an aperiodic reference signal for measuring channel quality. Downlink control information corresponding to each component carrier in which transmission control information of a reference signal for measuring channel quality is set is aggregated and assigned to a downlink control channel of a specific component carrier for a mobile terminal apparatus that performs radio communication in a system band containing a plurality of component carriers and transmitted, and when the mobile terminal apparatus controls transmission of the reference signal for measuring channel quality based on the transmission control information of the reference signal for measuring channel quality included in the received downlink control information, the downlink control information corresponding to each component carrier includes a bit field in which identifier information of the component carrier is set and the transmission control information of the reference signal for measuring channel quality is set in the bit field.

9 Claims, 11 Drawing Sheets

REFERENCE SIGNAL TRANSMITTING METHOD, MOBILE TERMINAL APPARATUS AND RADIO BASE STATION APPARATUS

TECHNICAL FIELD

The present invention relates to a reference signal transmitting method, a mobile terminal apparatus and a radio base station apparatus, and more particularly, to a reference signal transmitting method, a mobile terminal apparatus and a radio base station apparatus in a next-generation mobile communication system.

BACKGROUND ART

UMTS (Universal Mobile Telecommunications System) networks are making the most of the features of a W-CDMA (Wideband Code Division Multiple Access) based system by adopting HSDPA (High Speed Downlink Packet Access) and HSUPA (High Speed Uplink Packet Access) aiming at improving frequency utilization efficiency and improving data rates. For these UMTS networks, Long Term Evolution (LTE) is under study for the purpose of realizing higher data rates and lower delay or the like (e.g., see Non-Patent Literature 1).

Third-generation systems can generally realize a transmission rate on the order of maximum 2 Mbps on the downlink using a 5-MHz fixed band. On the other hand, LTE systems can realize a transmission rate of maximum 300 Mbps on the downlink and on the order of 75 Mbps on the uplink using a variable band of 1.4 MHz to 20 MHz. In the UMTS networks, systems as successors of LTE are also under study for the purpose of realizing a wider band and higher speed (e.g., LTE Advanced (LTE-A)). For example, LTE-A is scheduled to expand 20 MHz which is a maximum system band of the LTE specification to the order of 100 MHz.

In an LTE system, a radio base station apparatus (BS: Base Station) measures uplink channel quality based on SRS (Sounding Reference Signal) for measuring channel quality transmitted from a mobile terminal apparatus (UE: User Equipment), performs scheduling for the mobile terminal apparatus to transmit a data channel signal (PUSCH: Physical Uplink Shared CHannel) and instructs the scheduling using a PDCCH (Physical Downlink Control CHannel). In Release 8 LTE, SRS is multiplexed with a final symbol of a subframe constituting an uplink radio frame and periodically transmitted from the mobile terminal apparatus to the radio base station apparatus.

CITATION LIST

Non-Patent Literature

Non-Patent Literature 1: 3GPP, TR25.912 (V7.1.0), "Feasibility study for Evolved UTRA and UTRAN", Sept. 2006

SUMMARY OF THE INVENTION

Technical Problem

However, in an LTE system, even when there is no data channel signal transmitted from the mobile terminal apparatus over an uplink, SRS is periodically transmitted to the radio base station apparatus. For this reason, radio resources used for transmission of SRS are fixedly used regardless of the presence/absence of a data channel signal and there is a problem that it is difficult to efficiently use the radio resources.

FIG. 11 is a diagram illustrating an SRS transmitting method in the LTE system. As shown in FIG. 11, in the LTE system, SRS for measuring channel quality is multiplexed with the final symbol of a subframe (subframe #n to #n+9) constituting a radio frame of an uplink (UL) and periodically transmitted from the mobile terminal apparatus UE to the radio base station apparatus. FIG. 11 shows a case where assuming an SRS transmission period is 5 msec, SRS is multiplexed with the final symbol of subframes #n+1 and #n+6.

On the other hand, a data channel signal is transmitted over an uplink 4 TTIs (Transmission Time Intervals) after receiving a report of an uplink (UL) scheduling grant through a PDCCH. Here, a subframe is a transmission time unit of 1 data packet subjected to error correcting coding (channel coding) and is equivalent to 1 TTI. For this reason, a PUSCH is transmitted 4 subframes after receiving a report of the UL scheduling grant. FIG. 11 shows a case where a UL scheduling grant is reported in subframes #m to #m+2 and #m+4 of subframes (subframes #m to #m+9) making up a downlink (DL) radio frame. The PUSCH is transmitted in subframes #n+4 to #n+6 and #n+8 of the uplink (UL) according to these UL scheduling grants.

As shown in FIG. 11, since SRS is transmitted irrespective of the presence/absence of the PUSCH transmitted in each subframe, even in the case where there is no report of a UL scheduling grant and no PUSCH is transmitted, SRS is periodically transmitted to the radio base station apparatus over the uplink (UL). From the standpoint of efficient use of radio resources, SRS intended to measure channel quality in the radio base station apparatus is preferably measured when the PUSCH is transmitted. However, in the LTE system, since radio resources used to transmit SRS is fixedly used irrespective of the presence/absence of the PUSCH, it is difficult to efficiently use radio resources.

In order to solve this problem, LTE-A may apply aperiodic SRS that controls the opportunities of transmitting SRS at arbitrary timing.

However, when aperiodic SRS is applied, it is necessary to appropriately set and control information (SRS trigger) for controlling aperiodic SRS transmission timing or format information or the like. For example, a method of setting information on aperiodic SRS transmission control using a UL scheduling grant (UL grant) or DL assignment information may be adopted for aperiodic SRS transmission control, and aperiodic SRS transmission control information is always included in a UL-MIMO UL grant (DCI format 4) in Release 10 LTE-A, whereas control for increasing the number of PDCCH bits only when the aperiodic SRS transmission control information is included is applied to other scheduling grants. In this case, since the number of PDCCH bits increases as the aperiodic SRS transmission control information is added, the number of times blind decoding is performed increases, which may produce a load on the mobile terminal apparatus.

The present invention has been implemented in view of the above-described problems, and it is an object of the present invention to provide a reference signal transmitting method, a mobile terminal apparatus and a radio base station apparatus capable of suppressing influences on the PDCCH even when performing aperiodic SRS transmission control.

Solution to Problem

A mobile terminal apparatus according to the present invention is a mobile terminal apparatus that performs radio communication in a system band containing a plurality of component carriers, including a control channel receiving section configured to receive downlink control information corresponding to each component carrier, the downlink control information contains transmission control information of a reference signal for measuring channel quality and is aggregated and assigned to a downlink control channel of a specific component carrier, and a transmission setting section configured to control transmission of the reference signal for measuring channel quality based on the transmission control information of the reference signal for measuring channel quality contained in the downlink control information received by the control channel receiving section, wherein the downlink control information corresponding to each component carrier includes a bit field in which identifier information of the component carrier is set and the transmission control information of the reference signal for measuring channel quality is set in the bit field.

This configuration sets identifier information of the component carrier in combination with transmission control information of the reference signal for measuring channel quality (joint coding), and thereby effectively uses the bit field, and therefore eliminates the need for changing a downlink control channel format even when controlling transmission of an aperiodic reference signal for measuring channel quality, and can suppress an increase in the number of bits of the downlink control channel and reduce influences on the downlink control channel.

A radio base station apparatus according to the present invention is a radio base station apparatus that reports transmission control information of a reference signal for measuring channel quality to a mobile terminal apparatus that performs radio communication in a system band containing a plurality of component carriers and controls transmission of the reference signal for measuring channel quality of the mobile terminal apparatus, including a setting section configured to set transmission of the reference signal for measuring channel quality in each component carrier, and a setting reporting section configured to set the transmission control information of the reference signal for measuring channel quality in the downlink control information corresponding to each component carrier based on the information determined by the setting section, aggregates and assign the downlink control information corresponding to each component carrier to a downlink control channel of a specific component carrier and transmit the downlink control information to the mobile terminal apparatus, wherein the setting reporting section sets a bit field in which identifier information of the component carrier is set and the transmission control information of the reference signal for measuring channel quality in the downlink control information corresponding to each component carrier.

A reference signal transmitting method according to the present invention is a reference signal transmitting method for controlling transmission of a reference signal for measuring channel quality of a mobile terminal apparatus that performs radio communication in a system band containing a plurality of component carriers, the method including a step of receiving downlink control information containing transmission control information of a reference signal for measuring channel quality and corresponding to each component carrier which is aggregated and assigned to a downlink control channel of a specific component carrier, and a step of controlling transmission of the reference signal for measuring channel quality according to the transmission control information of the reference signal for measuring channel quality contained in the received downlink control information, wherein the downlink control information corresponding to each component carrier includes a bit field in which identifier information of the component carrier is set and the transmission control information of SRS is set in the bit field.

Technical Advantage of the Invention

According to the present invention, it is possible to suppress the influences on PDCCH even when transmitting aperiodic SRS.

BRIEF DESCRIPTION OF THE DRAWINGS

FIG. 10 is a diagram illustrating an example of a function block diagram of the baseband signal processing section of the radio base station apparatus according to the embodiment of the present invention; and.

DESCRIPTION OF EMBODIMENTS

The present inventor studied a method of preventing a PDCCH format from being changed accompanying a setting of aperiodic SRS transmission control information when aperiodic SRS is applied and suppressing a load caused by an increase in the number of PDCCH bits, and came up with an idea of performing a setting (joint coding) by adding the SRS transmission control information to specific information to be set in downlink control information. To be more specific, the present inventor came up with the invention of the present application by discovering the idea of setting SRS transmission control information in a bit field (CIF: Carrier Indicator Field) for setting a carrier identifier (CI: Carrier Indicator) in downlink control information (DCI: Downlink Control Information) when performing cross carrier scheduling in carrier aggregation that widens the bandwidth using a plurality of component carriers (CC).

Hereinafter, carrier aggregation in LTE-A which is under study in 3GPP will be described with reference to FIG. 1 and FIG. 2.

Figure 1:
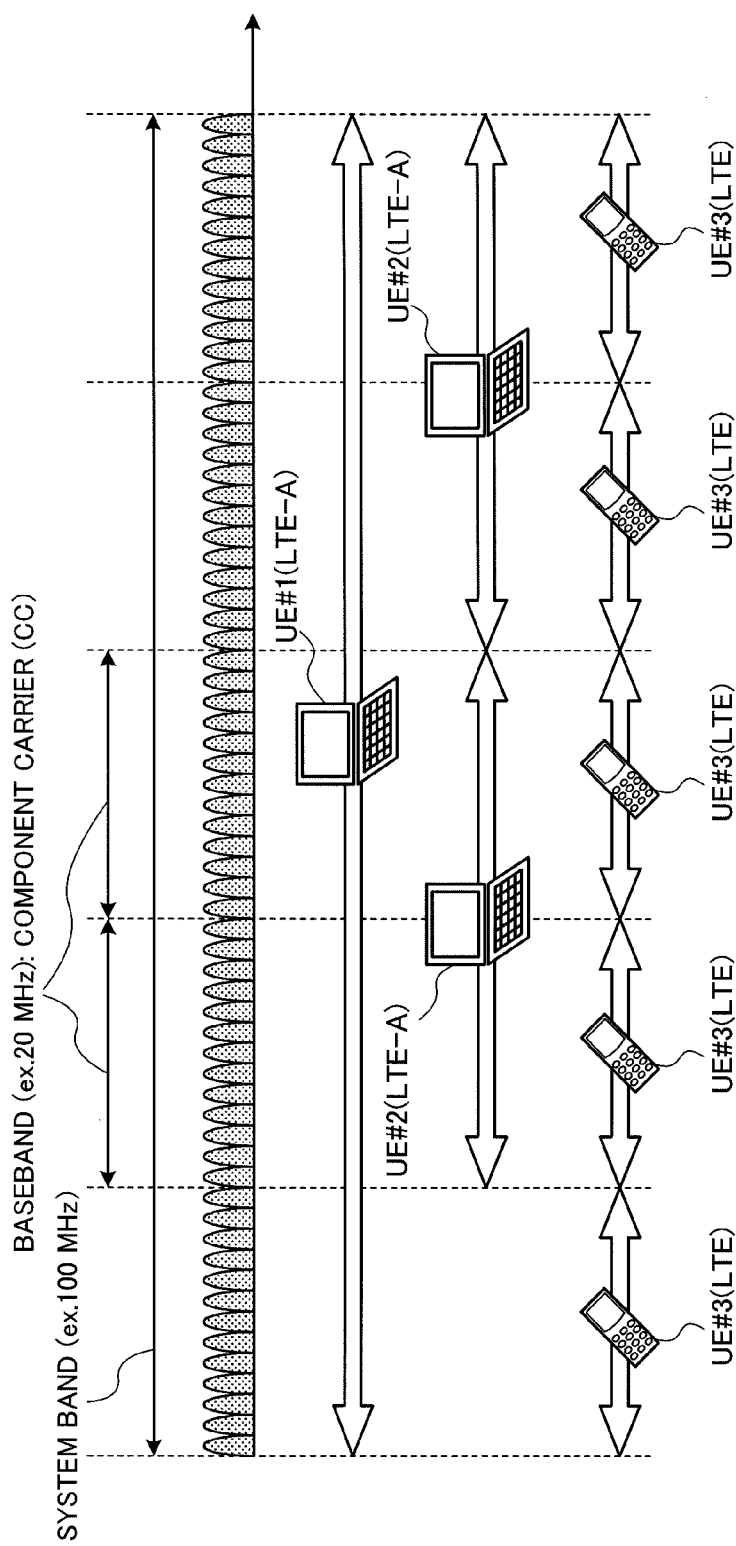
FIG. 1 is a diagram illustrating an example of a hierarchical bandwidth configuration defined in LTE-A.

FIG. 1 is a diagram illustrating a hierarchical bandwidth configuration under an agreement in LTE-A. The example shown in FIG. 1 is a hierarchical bandwidth configuration when an LTE-A system which is a first mobile communication system having a first system band made up of a plurality of component carriers and an LTE system which is a second mobile communication system having a second system band made up of one component carrier coexist. An LTE-A system performs radio communication using a variable system bandwidth, for example, of a maximum of 100 MHz and an LTE system performs radio communication using a variable system bandwidth, for example, of a maximum of 20 MHz. The system band of the LTE-A system includes at least one component carrier based on the unit of the system band of the LTE system and component carriers are dynamically or quasi-statically added or deleted. Thus, realizing a wider bandwidth using a plurality of component carriers is called "carrier aggregation."

For example, in FIG. 1, the system band of the LTE-A system is a system band (20 MHz×5=100 MHz) including five component carriers, assuming the system band (baseband: 20 MHz) of the LTE system as one component carrier. In FIG. 1, mobile terminal apparatus UE#1 is an LTE-A system compatible (also LTE system compatible) user terminal and supports a system band of up to 100 MHz. UE#2 is an LTE-A system compatible (also LTE system compatible) user terminal and supports a system band of up to 40 MHz (20 MHz×2=40 MHz). UE#3 is an LTE system compatible (LTE-A system non-compatible) user terminal and supports a system band of up to 20 MHz (baseband).

In radio communication in the system band of the wider-band LTE-A system, there can be a communication environment in which while some component carriers receive strong interference from other cells, other component carriers receive less interference. Thus, studies are under way on a structure in which downlink control information on a shared data channel (PDSCH/PUSCH) transmitted through component carriers strongly affected by interference from other cells is assigned from other component carriers less affected by interference. In the present specification, sending a PDCCH in other component carrier which is different from a component carrier for sending a PDSCH is referred to as "cross-carrier scheduling."

Furthermore, studies are also under way on cross-carrier scheduling whereby a bit field (CIF: Carrier Indicator Field) for setting a carrier identifier (CI) to identify a component carrier is added to downlink control information. An example of cross-carrier scheduling will be described with reference to FIG. 2.

Figure 2B:
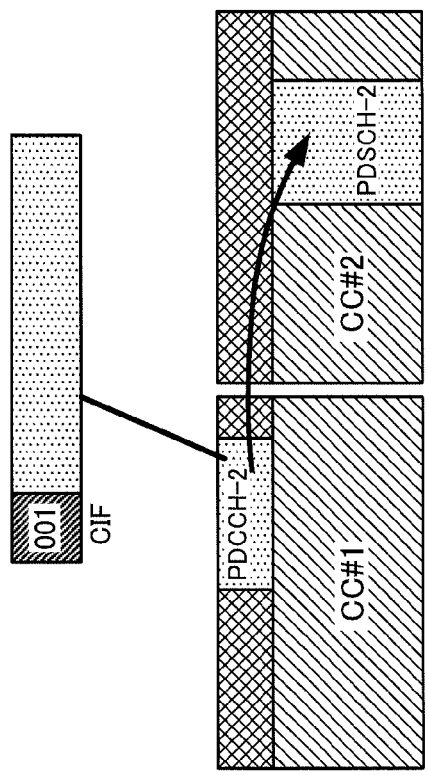
FIG. 2 is a diagram illustrating an example of cross carrier scheduling defined in LTE-A.
Figure 2A:
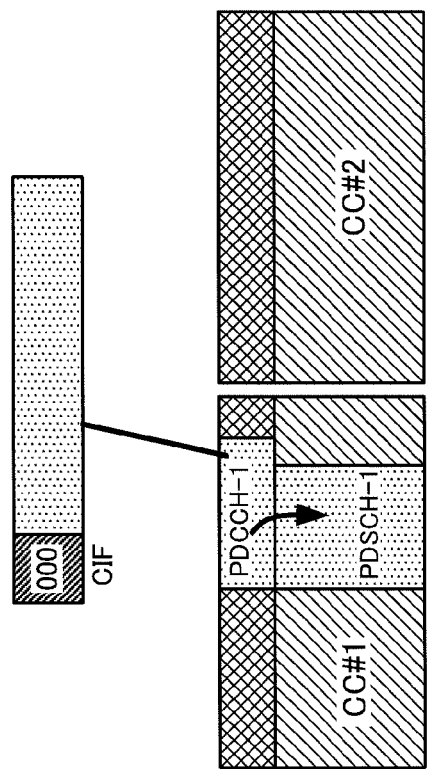

In FIG. 2, PDSCH-1 is assigned to component carrier CC#1 and PDSCH-2 is assigned to different component carrier CC#2. PDCCH-1 which is control information or the like for decoding PDSCH-1 is sent through the same component carrier CC#1 as that of PDSCH-1 (see FIG. 2A), whereas PDCCH-2 which is control information or the like for decoding PDSCH-2 is sent through a component carrier (CC#1) different from that of PDSCH-2 (see FIG. 2B). Furthermore, PDCCH-1 and PDCCH-2 each include a bit field (CIF) of 3 bits in which CI as component carrier identifier information is set.

The present inventor examined details of the bit field (CIF) in which a CI as component carrier identifier information is set and discovered that since a CI for identifying a component carrier only requires a small amount of information, if the number of component carriers is small, the bit field region is not efficiently used because part thereof remains unused.

When, for example, two component carriers are applied, in the 3-bit CIF, one bit is enough to set a CI, and therefore the rest of the region remains unused. The present inventor came up with an idea that it would be possible to effectively use the region of the CIF remaining unused when performing cross-carrier scheduling and came up with an idea of setting SRS transmission control information in the CIF in addition to the CI (performing joint coding on CI and SRS transmission control information).

Hereinafter, transmission control over aperiodic SRS in a mobile terminal apparatus that performs radio communication in a system band containing a plurality of component carriers will be described more specifically. The present embodiment will describe an example where the present invention is applied to LTE-A, but the present embodiment is not limited to the case where the present invention is applied to LTE-A.

The transmission control over aperiodic SRS according to the present embodiment aggregates, assigns and transmits downlink control information corresponding to each component carrier in which SRS transmission control information is set to a downlink control channel of a specific component carrier for a mobile terminal apparatus that performs radio communication in a system band containing a plurality of component carriers, and the mobile terminal apparatus controls SRS transmission based on the SRS transmission control information included in the received downlink control information. Furthermore, the downlink control information corresponding to each component carrier includes a bit field in which the component carrier identifier information is set and the SRS transmission control information is set in the bit field.

That is, the transmission control over aperiodic SRS according to the present embodiment sets the CI combined with SRS transmission control information in the CIF of the downlink control information (joint coding) when applying cross-carrier scheduling. This makes it possible to set SRS transmission control information necessary to be newly set accompanying aperiodic SRS transmission without providing any new data region in the downlink control information while making the most of the CIF region already set in the downlink control information. As a result, it is not necessary to change the PDCCH format even when performing aperiodic SRS transmission and it is possible to suppress an increase in the number of bits of the PDCCH and reduce influences on the PDCCH.

FIG. 3 shows transmission control over aperiodic SRS when the number of component carriers is 2. Here, FIG. 3 shows a case where a 3-bit CIF is defined in each of PDCCH-1 and PDCCH-2 corresponding to their respective component carriers.

Figure 3B:
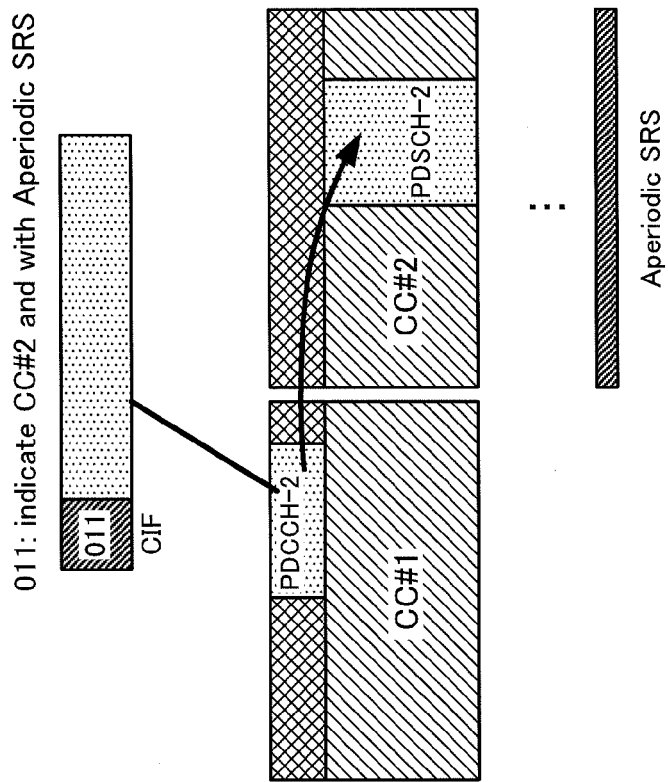
FIG. 3 is a diagram illustrating reference signal transmission control according to an embodiment of the present invention.
Figure 3A:
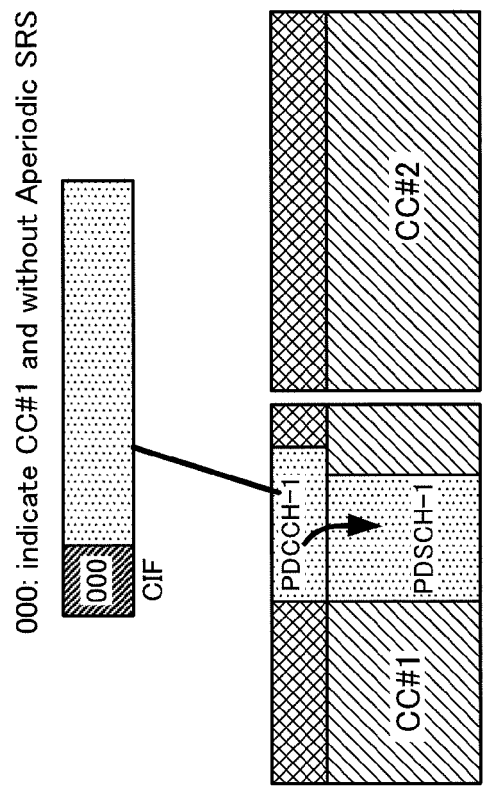

In FIG. 3A, identification information of CC#1 and SRS non-transmission instruction information are joint coded and set (e.g., "000") in the CIF of PDCCH-1. In this case, in CC#1, the mobile terminal apparatus decodes PDSCH-1 of CC#1 based on PDCCH-1 and does not transmit aperiodic SRS.

In FIG. 3B, PDCCH-2 corresponding to CC#2 is assigned to the control channel of CC#1 and identification information of CC#2 and SRS transmission instruction information are joint coded and set (e.g., "011") in the CIF of PDCCH-2. In this case, in CC#2, the mobile terminal apparatus decodes PDSCH-2 of CC#2 based on PDCCH-2 and transmits aperiodic SRS.

In transmission control of aperiodic SRS according to the present embodiment, the CIF setting method can be set as appropriate according to the number of component carriers.

Furthermore, in the aforementioned transmission control of aperiodic SRS, the CIF format information set based on the number of component carriers is preferably transmitted through RRC signaling or the like before transmitting downlink control information to the mobile terminal apparatus. This allows the CIF format information to be dynamically controlled according to the number of component carriers to which resources can be allocated.

Figure 4:
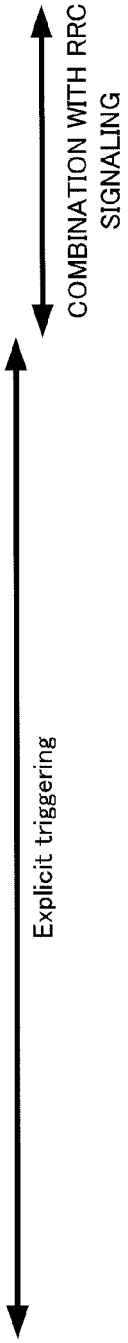
FIG. 4 is a diagram illustrating an example of a joint coding table of CI and aperiodic SRS transmission control information in reference signal transmission control according to the embodiment of the present invention.

Next, a specific example when a CI and aperiodic SRS transmission control information are joint coded in a CIF will be described with reference to FIG. 4. FIG. 4 illustrates an example of a joint coding table of CIs and aperiodic SRS transmission control information.

FIG. 4 illustrates an example of the setting method when the number of component carriers is 2 to 5 for a 3-bit CIF. When the number of component carriers is small (when the number of CCs is 2 to 4), this case can be handled with three bits, and it is thereby possible to set a CI for identifying each component carrier combined with aperiodic SRS transmission control information in the CIF and report the aperiodic SRS transmission control information to the mobile terminal apparatus using downlink control information.

On the other hand, when the number of component carriers is equal to or above a predetermined number (here, the number of CCs is 5 or more), the number of bits is not enough for the 3-bit CIF, and CIs for all component carriers and aperiodic SRS transmission control information cannot be set in combination, and therefore aperiodic SRS transmission control information is combined with other signals and reported to the mobile terminal apparatus. When, for example, the number of component carriers is 5, as shown in FIG. 4, it is possible to adopt a configuration in which a CI and aperiodic SRS transmission control information are joint coded in the CIF for CC#1 to CC#3, the CI is set in the CIF for CC#4 and CC#5 and aperiodic SRS transmission control information is reported through RRC signaling. Thus, by adopting the configuration in which aperiodic SRS transmission control information combined with other signals is reported to the mobile terminal apparatus, it is possible to dynamically control CIF format information according to the change of the number of component carriers and appropriately report aperiodic SRS transmission control information.

The joint coding table when a CI and aperiodic SRS transmission control information are joint coded in the CIF is not limited to the configuration shown in FIG. 4 above. Although FIG. 4 shows a case where the component carrier identifier and SRS transmission control information in the same component carrier are joint coded, CIs in different component carriers and SRS transmission control information may also be combined as combinations of CIs and SRS transmission control information. Furthermore, in the SRS transmission control shown in the present embodiment, the number of component carriers is not limited to 2 to 5, and the number of bits of the CIF is not limited to 3, either.

Figure 5:
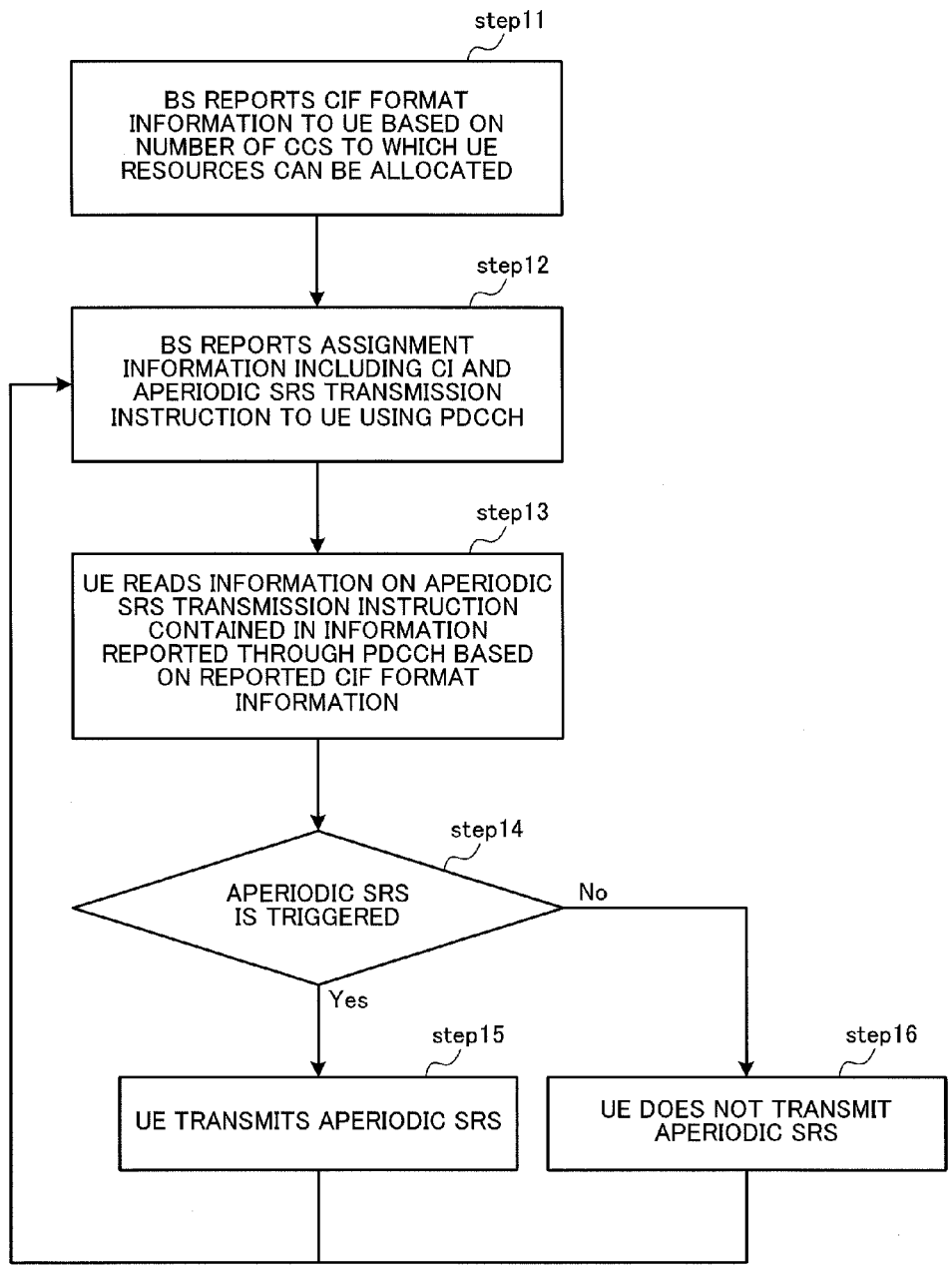
FIG. 5 is a diagram illustrating a procedure for reference signal transmission control according to the embodiment of the present invention.

A more specific procedure of aperiodic SRS transmission control will be described below with reference to FIG. 5.

First, the radio base station apparatus generates CIF format information based on the number of component carriers to which resources can be allocated and reports the CIF format information to the mobile terminal apparatus that performs radio communication in a system band containing a plurality of component carriers (step 11). The CIF format information can be set as appropriate as shown in FIG. 4 above. Furthermore, the CIF format information can be reported to the mobile terminal apparatus using RRC signaling.

Next, the radio base station apparatus decides/sets whether or not to transmit SRS in each component carrier, sets aperiodic SRS transmission control information in the downlink control information corresponding to each component carrier based on the set information, aggregates and assigns the downlink control information corresponding to each component carrier to a downlink control channel of a specific component carrier and transmits the downlink control channel to the mobile terminal apparatus (step 12). The downlink control information includes the CIF in which the CI which is component carrier identifier information and aperiodic SRS transmission control information are joint coded. A PDCCH may be reported to the mobile terminal apparatus using a UL grant or DL grant.

Next, the mobile terminal apparatus reads the SRS transmission control information contained in the CIF of the downlink control information based on the received CIF format information and downlink control information (step 13).

When the SRS transmission control information is information for transmitting (triggering) SRS, the mobile terminal apparatus transmits the SRS at predetermined timing and with a predetermined resource (steps 14 and 15). On the other hand, when the SRS transmission control information is information for not triggering SRS, the mobile terminal apparatus does not transmit the SRS (steps 14 and 16).

Thus, applying the aperiodic SRS transmission control shown in the present embodiment makes it possible to set SRS transmission control information which needs to be newly set for aperiodic SRS transmission using the CIF region set in the downlink control information, and thereby eliminates the need for changing the PDCCH format, also suppresses an increase in the number of PDCCH bits to thereby reduce influences on the PDCCH.

The configurations of the mobile terminal apparatus and radio base station apparatus to which the aforementioned reference signal transmission control is applied will be described below. Here, a case where the radio base station apparatus and mobile terminal apparatus supporting the LTE-A-based system (LTE-A system) will be described.

Figure 6:
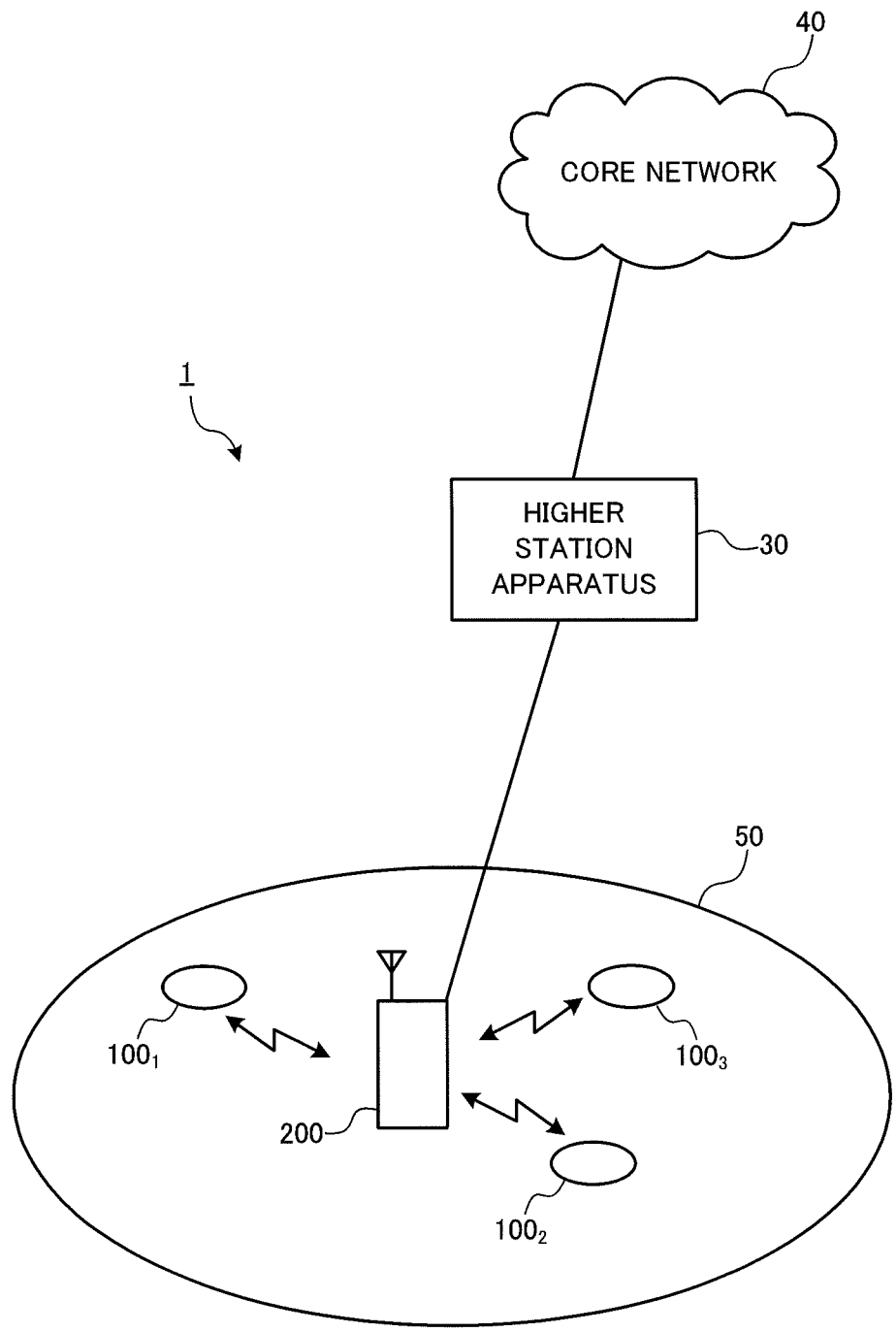
FIG. 6 is a diagram illustrating a configuration of a mobile communication system according to the embodiment of the present invention.

First, a mobile communication system 1 including a mobile terminal apparatus 100 and a radio base station apparatus 200 will be described with reference to FIG. 6. FIG. 6 is a diagram illustrating the configuration of the mobile communication system 1 including the mobile terminal apparatus 100 and the radio base station apparatus 200 according to an embodiment of the present invention. The mobile communication system 1 shown in FIG. 6 is, for example, a system including an LTE system or SUPER 3G. This mobile communication system 1 may also be called "IMT-Advanced" or "4G."

As shown in FIG. 6, the mobile communication system 1 is configured by including the radio base station apparatus 200 and a plurality of the mobile terminal apparatuses 100 ($100_1$, $100_2$, $100_3$, ... $100_n$, where n is an integer greater than 0) that communicate with the radio base station apparatus 200. The radio base station apparatus 200 is connected to a higher station apparatus 30 and the higher station apparatus 30 is connected to a core network 40. The mobile terminal apparatus 100 communicates with the radio base station apparatus 200 in a cell 50. The higher station apparatus 30 includes, but is not limited to, for example, an access gateway apparatus, a radio network controller (RNC), a mobility management entity (MME) or the like.

As a radio access scheme for the mobile communication system 1, OFDMA (Orthogonal Frequency Division Multiple Access) is applied to a downlink and SC-FDMA (Single Carrier Frequency Division Multiple Access) or Clustered DFT-Spread OFDMA is applied to an uplink.

OFDMA is a multicarrier transmission scheme whereby a frequency band is divided into a plurality of narrow frequency bands (subcarriers) and data is mapped to respective subcarriers to perform communication. SC-FDMA is a single carrier transmission scheme whereby a system band is divided into bands, each band being composed of one or serial resource blocks, for each terminal and a plurality of terminals use different bands to thereby reduce interference among terminals. Clustered DFT-spread OFDMA is a scheme whereby a group (cluster) of discontinuous clustered subcarriers is assigned to one mobile terminal UE and discrete Fourier transform spread OFDM is applied to each cluster to realize uplink multiple access.

Here, communication channels in an LTE system will be described. For a downlink, a PDSCH shared among the mobile terminal apparatuses 100 and a downlink L1/L2 control channel (PDCCH, PCFICH, PHICH) are used. User data, that is, a normal data signal is transmitted through this PDSCH. Transmission data is contained in the user data. A UL scheduling grant (UL grant) containing a transmission identification bit and DL scheduling information (DL assignment) are reported to the mobile terminal apparatus 100 through the L1/L2 control channel (PDCCH).

For an uplink, a PUSCH shared among the mobile terminal apparatuses 100 and a PUCCH which is an uplink control channel are used. User data is transmitted through this PUSCH. Furthermore, downlink radio quality information (CQI: Channel Quality Indicator) or the like is transmitted through the PUCCH.

Figure 7:
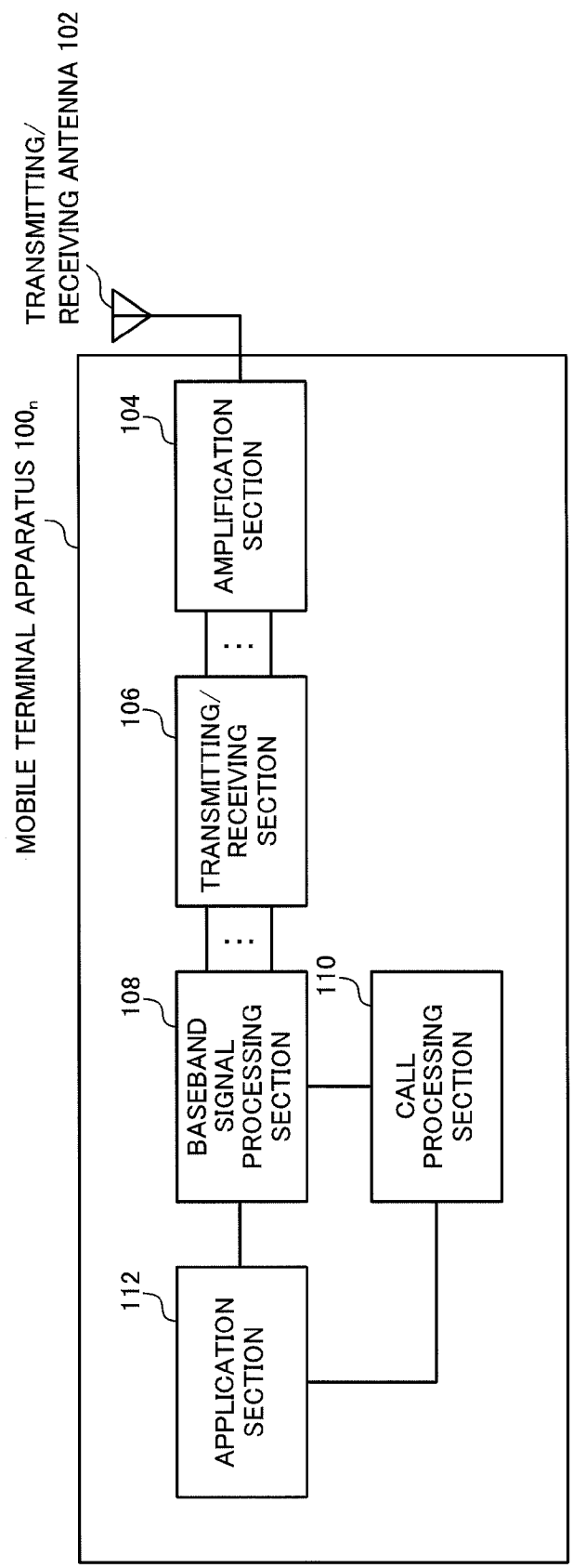
FIG. 7 is a block diagram illustrating an overall configuration of a mobile terminal apparatus according to the embodiment of the present invention.

Next, the functional configuration of the mobile terminal apparatus will be described with reference to FIG. 7. FIG. 7 is an example of a function block diagram of the mobile terminal apparatus in the present embodiment.

As shown in FIG. FIG. 7, a mobile terminal apparatus $100_n$ is configured by including a transmitting/receiving antenna 102, an amplification section 104 corresponding to the transmitting/receiving antenna 102, a transmitting/receiving section 106, a baseband signal processing section 108, a call processing section 110, and an application section 112.

Uplink data is inputted from the application section 112 to the baseband signal processing section 108. The baseband signal processing section 108 performs processing of retransmission control (H-ARQ (Hybrid ARQ)), scheduling, transmission format selection, channel coding, transmission power setting or the like and transfers the processed signal to the transmitting/receiving section 106 for each antenna. The transmitting/receiving section 106 frequency-converts the baseband signal outputted from the baseband signal processing section 108 to a radio frequency signal for each antenna. The frequency-converted signal is then amplified by the amplification section 104 and transmitted from the transmitting/receiving antenna 102 for each antenna.

Regarding downlink data, a radio frequency signal received by the transmitting/receiving antenna 102 is amplified in the amplification section 104 so that receiving power is corrected to predetermined power under AGC (Auto Gain Control). The amplified radio frequency signal is frequency-converted to a baseband signal in the transmitting/receiving section 106. This baseband signal is subjected to predetermined processing (error correction, decoding or the like) in the baseband signal processing section 108 and then transferred to the call processing section 110 and the application section 112. The call processing section 110 performs management of communication with the radio base station apparatus or the like and the application section 112 performs processing relating to layers higher than a physical layer or MAC layer.

Figure 8:
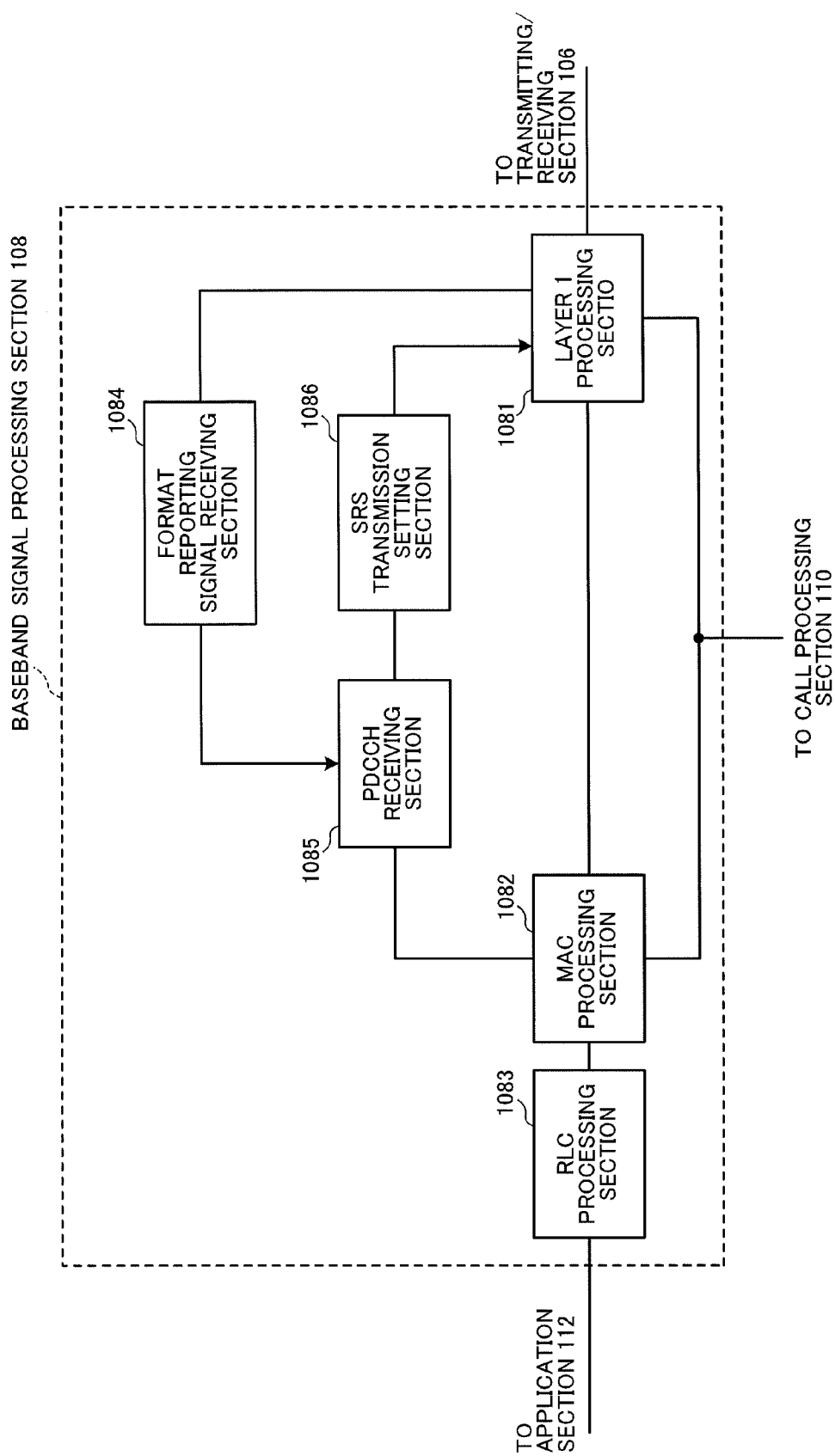
FIG. 8 is a diagram illustrating an example of a function block diagram of the baseband signal processing section of the mobile terminal apparatus according to the embodiment of the present invention.

Next, the functional configuration of the baseband processing section of the mobile terminal apparatus shown in FIG. 7 above will be described with reference to FIG. 8.

The baseband signal processing section 108 includes a layer 1 processing section 1081, a MAC processing section 1082, an RLC processing section 1083, a format reporting signal receiving section 1084, a PDCCH receiving section 1085, and an SRS transmission setting section 1086.

The layer 1 processing section 1081 performs processing mainly on the physical layer. The layer 1 processing section 1081 performs processing such as channel decoding, discrete Fourier transform (DFT) frequency demapping, inverse Fourier transform (IFFT), data demodulation on a signal received over a downlink. On the other hand, the layer 1 processing section 1081 performs processing such as channel coding, data modulation, frequency mapping, inverse Fourier transform (IFFT) or the like on a signal transmitted over an uplink.

The MAC processing section 1082 performs retransmission control (HARQ) in the MAC layer, analysis of scheduling information for the downlink (identification of PDSCH transmission format, identification of PDSCH resource blocks) or the like on a signal received over the downlink. Furthermore, the MAC processing section 1082 performs MAC retransmission control, analysis of uplink scheduling information (processing such as identification of PUSCH transmission format, identification of PUSCH resource blocks) or the like on a signal transmitted over the uplink.

The RLC processing section 1083 performs packet division, packet combination and retransmission control in an RLC layer or the like on a packet received over the uplink and a packet received from the application section 112 and transmitted over the downlink.

The format reporting signal receiving section 1084 receives the CIF format information reported from the radio base station apparatus. The format information can be received through RRC signaling. To be more specific, the mobile terminal apparatus and the radio base station apparatus are provided with the joint coding table shown in FIG. 4 and report a CIF format applied based on the number of component carriers to which resources can be allocated. Furthermore, when the number of component carriers is a predetermined number or above (e.g., the number of CCs in FIG. 4 is 5 or above), the mobile terminal apparatus receives aperiodic SRS transmission control information regarding CC#4 and CC#5 in addition to the CIF format information through RRC signaling.

The PDCCH receiving section 1085 receives downlink control information corresponding to each component carrier which is aggregated and assigned to a downlink control channel of a specific component carrier and reads SRS transmission control information included in the CIF based on the format information received by the format reporting signal receiving section 1084. For example, when the number of component carriers is two (CC#1 and CC#2), PDCCHs of CC#1 and CC#2 each include a CIF in which a CI and aperiodic SRS transmission control information are joint coded, and SRS transmission control information of CC#1 and CC#2 is read from the CIFs of the PDCCHs of CC#1 and CC#2.

The SRS transmission setting section 1086 controls SRS transmission based on the SRS transmission control information set in the CIF of the downlink control information received by the PDCCH receiving section 1085. For example, when the identifier of CC#1 and the SRS transmission instruction information are set in the CIF, aperiodic SRS is transmitted to the radio base station apparatus at timing and with a resource determined in CC#1. On the other hand, when SRS non-transmission instruction information is set in the CIF, SRS transmission is not performed.

Figure 9:
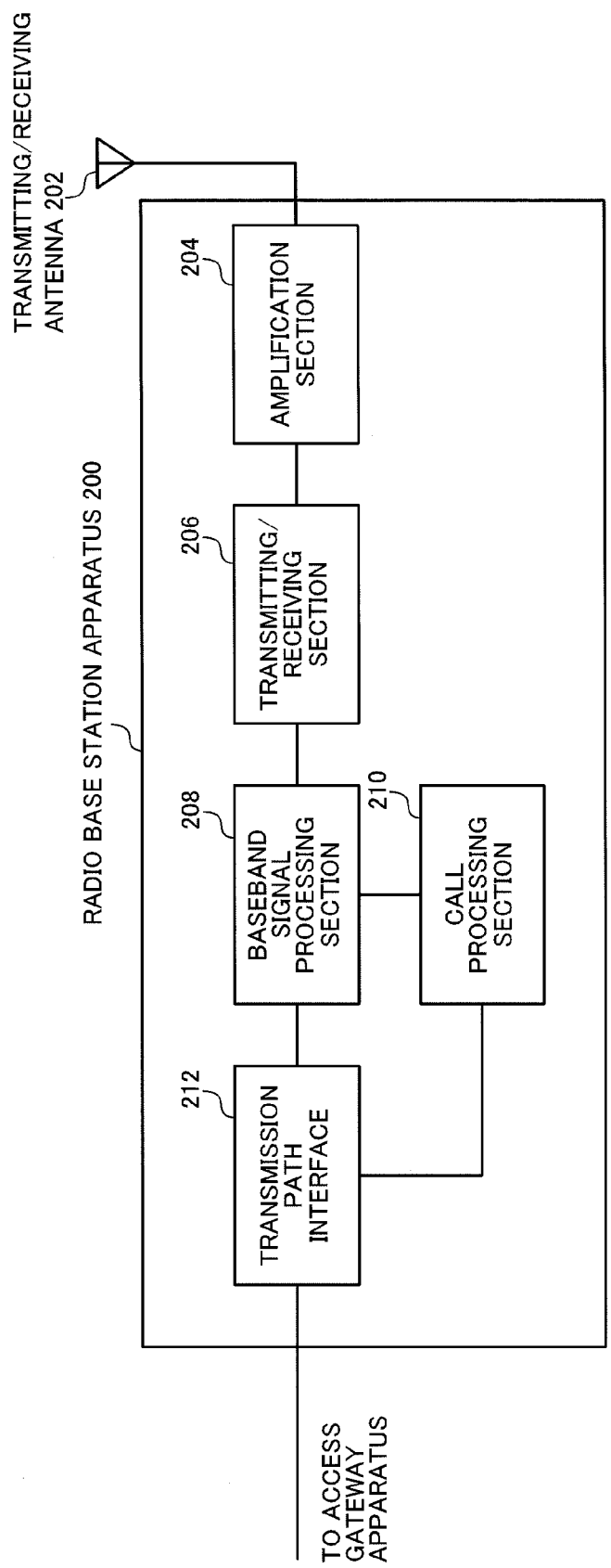
FIG. 9 is a block diagram illustrating an overall configuration of a radio base station apparatus according to the embodiment of the present invention.

Next, the functional configuration of the radio base station apparatus will be described with reference to FIG. 9. FIG. 9 is an example of a functional block diagram of the radio base station apparatus.

As shown in FIG. 9, a radio base station apparatus 200 is configured by including a transmitting/receiving antenna 202, an amplification section 204, a transmitting/receiving section 206, a baseband signal processing section 208, a call processing section 210, and a transmission path interface 212. The radio base station apparatus 200 may also be provided with a plurality of transmitting/receiving antennas 202.

For uplink data, a radio frequency signal received by the transmitting/receiving antenna 202 is amplified in the amplification section 204 under AGC so that receiving power is corrected to predetermined power. The amplified radio frequency signal is frequency-converted to a baseband signal in the transmitting/receiving section 206. This baseband signal is subjected to predetermined processing (error correction, decoding or the like) in the baseband signal processing section 208 and then transferred to an access gateway apparatus (not shown) via the transmission path interface 212. The access gateway apparatus is connected to the core network and manages each mobile terminal.

Downlink data is inputted from a higher apparatus to the baseband signal processing section 208 via the transmission path interface 212. The baseband signal processing section 208 performs processing of retransmission control (H-ARQ (Hybrid ARQ)), scheduling, transmission format selection, channel coding or the like and transfers the data to the transmitting/receiving section 206. The transmitting/receiving section 206 frequency-converts the baseband signal outputted from the baseband signal processing section 208 to a radio frequency signal. The frequency-converted signal is then amplified in the amplification section 204 and transmitted from the transmitting/receiving antenna 202.

The call processing section 210 transmits/receives a call processing control signal to/from the radio control station which is a higher apparatus and performs state management and resource allocation of the radio base station apparatus 200. The processing in the layer 1 processing section 2081 and the MAC processing section 2082 is performed based on the state of communication between the radio base station apparatus 200 and the mobile terminal apparatus $100_n$ set in the call processing section 210.

Figure 10:
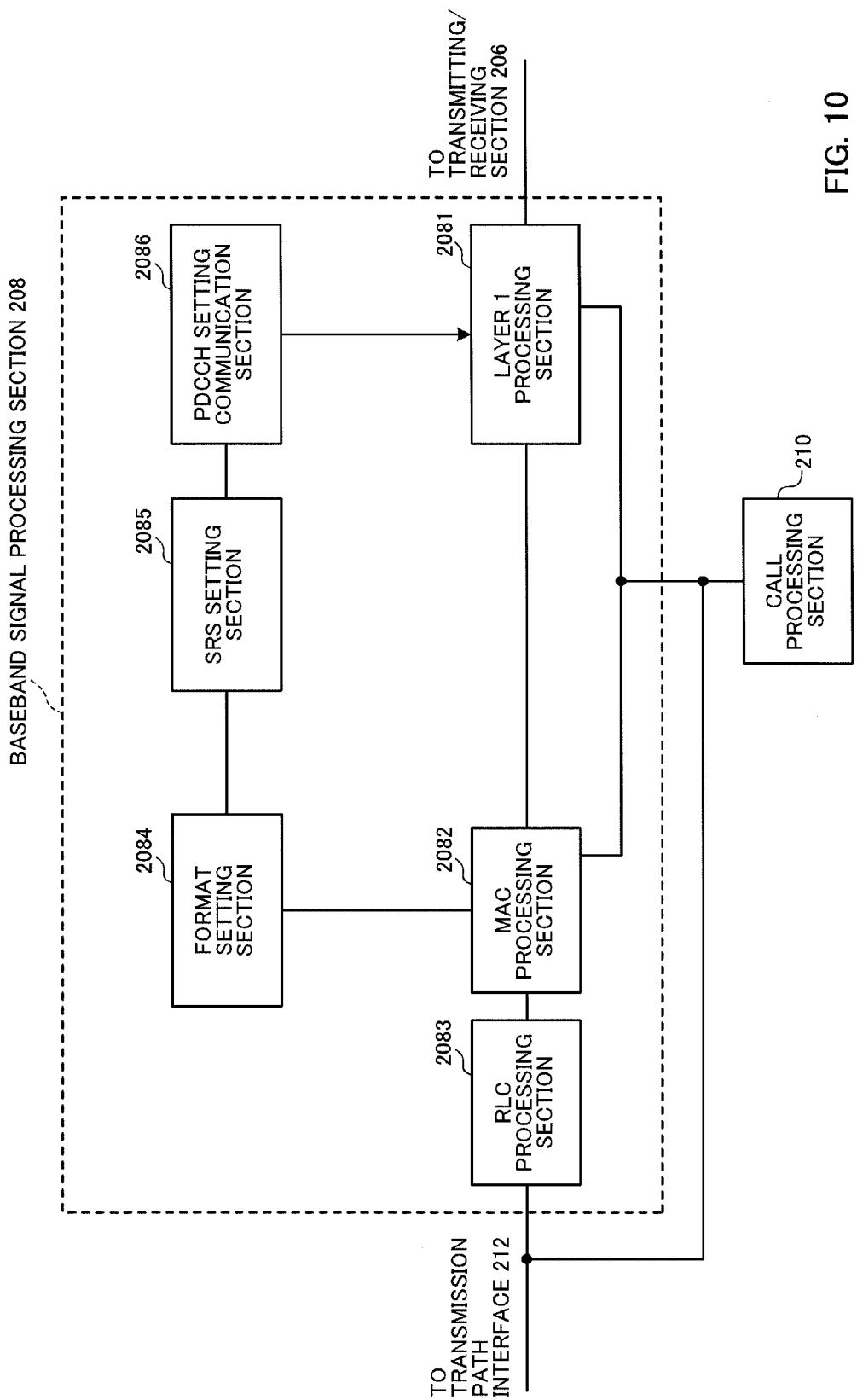
Figure 11:
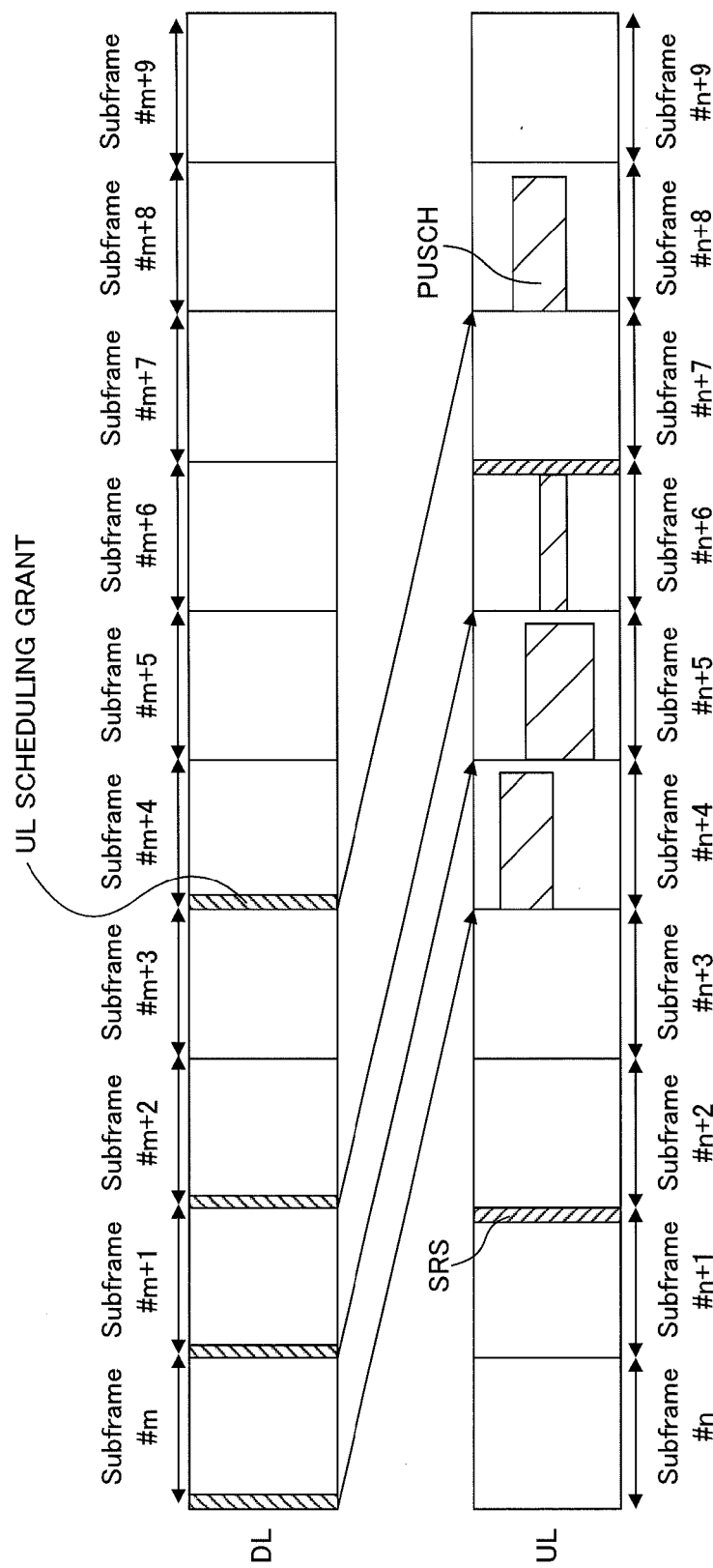
FIG. 11 is a diagram illustrating an SRS transmitting method in an LTE system.

Next, the functional configuration of the baseband processing section will be described with reference to FIG. 10. FIG. 10 is a function block diagram of the baseband signal processing section of the radio base station apparatus.

As shown in FIG. 10, the baseband signal processing section 208 includes a layer 1 processing section 2081, a MAC (Medium Access Control) processing section 2082, an RLC processing section 2083, a format setting section 2084, an SRS setting section 2085, and a PDCCH setting reporting section 2086.

The layer 1 processing section 2081 performs processing mainly on the physical layer. The layer 1 processing section 2081 performs processing such as channel decoding, discrete Fourier transform (DFT), frequency demapping, inverse Fourier transform (IFFT), data demodulation on a signal received over the uplink. Furthermore, the layer 1 processing section 2081 performs processing such as channel coding, data modulation, frequency mapping, inverse Fourier transform (IFFT) on a signal transmitted over the downlink.

The MAC processing section 2082 performs processing such as retransmission control (HARQ) in the MAC layer, scheduling on the uplink/downlink, selection of a PUSCH/PDSCH transmission format, selection of a PUSCH/PDSCH resource block or the like on the signal received over the uplink.

The RLC processing section 2083 performs packet division, packet combination, retransmission control in the RLC layer or the like on a packet received over the uplink or a packet transmitted over the downlink.

The format setting section 2084 generates format information of a CIF contained in the downlink control information based on the number of component carriers to which resources can be allocated and reports the format information to the mobile terminal apparatus. Reporting to the mobile terminal apparatus can be performed using RRC signaling.

The SRS setting section 2085 decides and sets the presence/absence of aperiodic SRS transmission in each component carrier. When the number of component carriers is equal to or above a predetermined number (e.g., the number of CCs in FIG. 4 above is 5 or above) and when aperiodic SRS transmission control information of some component carriers (CC#4, CC#5 in FIG. 4) is reported through RRC signaling, the SRS transmission control information of CC#4, CC#5 set in the SRS setting section 2085 is reported through RRC signaling.

The PDCCH setting reporting section 2086 sets SRS transmission control information in the downlink control information corresponding to each component carrier based on the information set in the SRS setting section 2085, aggregates and assigns the downlink control information corresponding to each component carrier to a downlink control channel of a specific component carrier and transmits the downlink control channel to the mobile terminal apparatus. For example, when the number of component carriers is two (CC#1 and CC#2), if the SRS setting section 2085 makes such a setting that CC#1 does not transmit aperiodic SRS and CC#2 transmits aperiodic SRS, the PDCCH setting reporting section 2086 joint codes CI and SRS transmission control information in the CIFs of CC#1 and CC#2 (CC#1 is "000" and CC#2 is "011" in FIG. 4), assigns PDCCH-1 corresponding to CC#1 and PDCCH-2 corresponding to CC#2 to the control channel of CC#1 and reports this to the mobile terminal apparatus.

Hereinafter, the aperiodic SRS transmission control in the mobile terminal apparatus and the radio base station apparatus will be described more specifically.

First, the radio base station apparatus generates, through the format setting section 2084, CIF format information of the downlink control information based on the number of component carriers to which resources can be allocated and the radio base station apparatus reports the CIF format information to the mobile terminal apparatus using RRC signaling. A case will be described below as an example where the joint coding table shown in FIG. 4 above is used when the number of component carriers is three (CC#1 to CC#3).

The mobile terminal apparatus receives, through the format reporting signal receiving section 1084, format information of the CIF reported from the radio base station apparatus. Here, the format information applied when the number of component carriers is three is reported.

Next, the radio base station apparatus decides and sets, through the SRS setting section 2085, the presence/absence of aperiodic SRS transmission for each component carrier. Here, the SRS setting section 2085 makes such a setting that CC#1 and CC#2 transmit aperiodic SRS and CC#3 does not transmit aperiodic SRS.

Next, the radio base station apparatus sets, through the PDCCH setting reporting section 2086, SRS transmission control information in downlink control information corresponding to CC#1 to CC#3 based on the information set in the SRS setting section 2085, aggregates and assigns the downlink control information corresponding to CC#1 to CC#3 to a downlink control channel of a specific component carrier (here, CC#1) and transmits the downlink control information to the mobile terminal apparatus. When using the joint coding table shown in FIG. 4, the PDCCH setting reporting section 2086 sets the CIF of CC#1 to "001," the CIF of CC#2 to "011," the CIF of CC#3 to "100" and assigns PDCCH-1 corresponding to CC#1, PDCCH-2 corresponding to CC#2 and PDCCH-3 corresponding to CC#3 to the control channel of CC#1 and reports the assigned PDCCHs to the mobile terminal apparatus.

The mobile terminal apparatus receives, through the PDCCH receiving section 1085, downlink control information (PDCCH-1 to PDCCH-3) corresponding to CC#1 to CC#3 aggregated and assigned to the downlink control channel of CC#1 and reads SRS transmission control information from the CIFs of CC#1 to CC#3 based on the format information received by the format reporting signal receiving section 1084.

Next, the SRS transmission setting section 1086 in the mobile terminal apparatus controls SRS transmission based on the transmission control information received by the PDCCH receiving section 1085. Here, CC#1 and CC#2 transmit aperiodic SRS and CC#3 does not transmit aperiodic SRS.

Thus, the aperiodic SRS transmission control method according to the present embodiment adopts a configuration in which component carrier identifier information and SRS transmission control information are joint coded so as to effectively use the CIF region, thereby eliminates the need for changing the PDCCH format, and can suppress an increase in the number of bits of the PDCCH and reduce influences on the PDCCH.

The embodiment disclosed herein is meant to be illustrative, and not limitative in all aspects. The scope of the present invention is defined not only by the description of the above embodiment but by the scope of claims and all modifications within the meaning and scope equivalent to the scope of claims are intended to be incorporated herein.

The present application is based on Japanese Patent Application No. 2010-141069 filed on Jun. 21, 2010, entire content of which is expressly incorporated by reference herein.

The invention claimed is:

1. A mobile terminal apparatus that performs radio communication in a system band containing a plurality of component carriers, comprising:
 a control channel receiving section configured to receive downlink control information corresponding to each component carrier, the downlink control information contains transmission control information of a reference signal for measuring channel quality and wherein downlink control information corresponding to each component carrier is aggregated and assigned to a downlink control channel of a specific component carrier;
 a transmission setting section configured to control transmission of the reference signal for measuring channel quality based on the transmission control information of the reference signal for measuring channel quality contained in the downlink control information received by the control channel receiving section; and
 a format reporting signal receiving section configured to receive format information of a bit field that is set based on a number of component carriers to which resources can be allocated, wherein:
 the downlink control information corresponding to each component carrier comprises the bit field in which identifier information of a component carrier is set and the transmission control information of the reference signal for measuring channel quality is also set in the bit field,
 the format information is related to a correspondence relationship between the bit field, the identifier information, and the transmission control information of the reference signal for measuring channel quality, and
 the control channel receiving section reads the transmission control information of the reference signal for measuring channel quality set in the bit field based on the format information.

2. The mobile terminal apparatus according to claim 1, wherein the format information is received using radio resource control (RRC) signaling.

3. The mobile terminal apparatus according to claim 2, wherein when the number of component carriers to which the resources can be allocated is equal to or above a predetermined number greater than one, and a subset of the transmission control information of the reference signal for measuring channel quality is received using the RRC signaling.

4. A radio base station apparatus that reports transmission control information of a reference signal for measuring channel quality to a mobile terminal apparatus that performs radio communication in a system band containing a plurality of component carriers and controls transmission of the reference signal for measuring channel quality of the mobile terminal apparatus, comprising:
 a setting section configured to set transmission of the reference signal for measuring channel quality in each component carrier;
 a reporting section configured to set the transmission control information of the reference signal for measuring channel quality in downlink control information corresponding to each component carrier based on the information determined by the setting section, aggregate the downlink control information corresponding to each component carrier, and assign the downlink control information corresponding to each component carrier to a downlink control channel of a specific component carrier and transmit the downlink control information to the mobile terminal apparatus; and
 a format setting section configured to generate format information of a bit field that is set based on a number of component carriers to which resources can be allocated and report the format information to the mobile terminal apparatus, wherein:
 the reporting section sets the bit field in which identifier information of a component carrier is set and the transmission control information of the reference signal for measuring channel quality is set in the downlink control information corresponding to each component carrier,
 the format information is related to a correspondence relationship between the bit field, the identifier information of the component carrier, and the transmission control information of the reference signal for measuring channel quality, and
 the reporting section sets the transmission control information of the reference signal for measuring channel quality in the bit field based on the format information.

5. The radio base station apparatus according to claim 4, wherein the format setting section transmits the format information using radio resource control (RRC) signaling.

6. The radio base station apparatus according to claim 5, wherein when the number of component carriers to which the resources can be allocated is equal to or above a predetermined number greater than one, and a subset of the transmission control information of the reference signal for measuring channel quality is transmitted using the RRC signaling.

7. A reference signal transmitting method for controlling transmission of a reference signal for measuring channel quality of a mobile terminal apparatus that performs radio communication in a system band containing a plurality of component carriers, the method comprising:

receiving downlink control information corresponding to each component carrier, the downlink control information contains transmission control information of a reference signal for measuring channel quality and wherein downlink control information corresponding to each component carrier is aggregated and assigned to a downlink control channel of a specific component carrier;

controlling transmission of the reference signal for measuring channel quality according to the transmission control information of the reference signal for measuring channel quality contained in the received downlink control information; and receiving format information of a bit field that is set based on a number of component carriers to which resources can be allocated, wherein:

the downlink control information corresponding to each component carrier comprises the bit field in which identifier information of a component carrier is set and the transmission control information of the reference signal for measuring channel quality is also set in the bit field, the format information is related to a correspondence relationship between the bit field, the identifier information, and the transmission control information of the reference signal for measuring channel quality, and reading the transmission control information of the reference signal for measuring channel quality set in the bit field based on the format information.

8. A reference signal transmitting method for reporting transmission control information of a reference signal for measuring channel quality to a mobile terminal apparatus that performs radio communication in a system band comprising a plurality of component carriers and controlling transmission of the reference signal for measuring channel quality of the mobile terminal apparatus, the method comprising:

deciding transmission of the reference signal for measuring channel quality in each component carrier; and setting transmission control information of the reference signal for measuring channel quality in downlink control information corresponding to each component carrier based on transmission decision information of the reference signal for measuring channel quality, aggregating and assigning downlink control information corresponding to each component carrier to a downlink control channel of a specific component carrier and transmitting the downlink control channel to the mobile terminal apparatus; and generating format information of a bit field that is set based on a number of component carriers to which resources can be allocated and reporting the format information to the mobile terminal apparatus, wherein:

the bit field in which identifier information of a component carrier is set and the transmission control information of the reference signal for measuring channel quality are set in the downlink control information corresponding to each component carrier, the format information is related to a correspondence relationship between the bit field, the identifier information, and the transmission control information of the reference signal for measuring channel quality, and setting the transmission control information of the reference signal for measuring channel quality in the bit field based on the format information.

9. A communication system that performs radio communication between a radio base station apparatus and a mobile terminal apparatus using a system band containing a plurality of component carriers, the mobile terminal apparatus comprising:

a control channel receiving section configured to receive downlink control information corresponding to each component carrier, the downlink control information contains transmission control information of a reference signal for measuring channel quality and wherein downlink control information corresponding to each component carrier is aggregated and assigned to a downlink control channel of a specific component carrier; and a transmission setting section configured to control transmission of the reference signal for measuring channel quality based on the transmission control information of the reference signal for measuring channel quality contained in the downlink control information received by the control channel receiving section; and a format reporting signal receiving section configured to receive format information of a bit field that is set based on a number of component carriers to which resources can be allocated, wherein:

the downlink control information corresponding to each component carrier comprises the bit field in which identifier information of a component carrier is set and the transmission control information of the reference signal for measuring channel quality is also set in the bit field, the format information is related to a correspondence relationship between the bit field, the identifier information, and the transmission control information of the reference signal for measuring channel quality, and the control channel receiving section reads the transmission control information of the reference signal for measuring channel quality set in the bit field based on the format information, and the radio base station apparatus comprising:

a setting section configured to set transmission of the reference signal for measuring channel quality in each component carrier;

a reporting section configured to set the transmission control information of the reference signal for measuring channel quality in the downlink control information corresponding to each component carrier based on the information determined by the setting section, aggregate and assign the downlink control information corresponding to each component carrier to a downlink control channel of the specific component carrier and transmit the downlink control information to the mobile terminal apparatus; and a format setting section configured to generate the format information of the bit field based on the number of component carriers to which resources can be allocated and report the format information to the mobile terminal apparatus, wherein:

the reporting section sets the bit field in which the identifier information of the component carrier is set and the transmission control information of the reference signal for measuring channel quality is set in the downlink control information corresponding to each component carrier, and the reporting section sets the transmission control information of the reference signal for measuring channel quality in the bit field based on the format information.

* * * * *